July 15, 1969  C. VAN DER LELY  3,455,608
DEVICE FOR FEEDING CROP TO A STORAGE LOCATION OR A CONVEYOR
Filed July 26, 1966  5 Sheets-Sheet 1
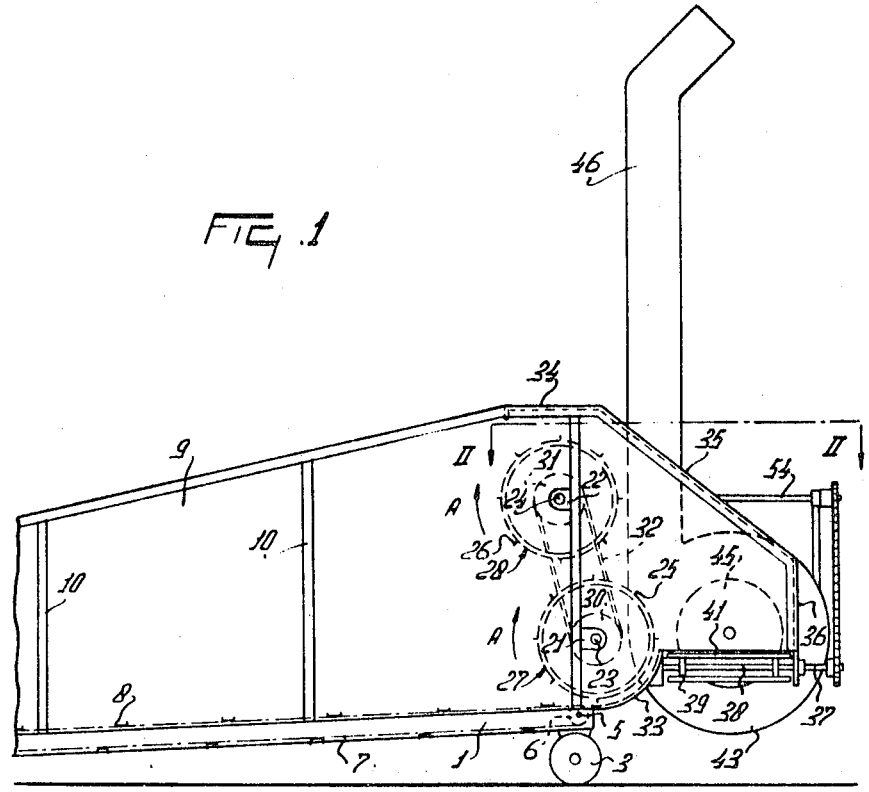
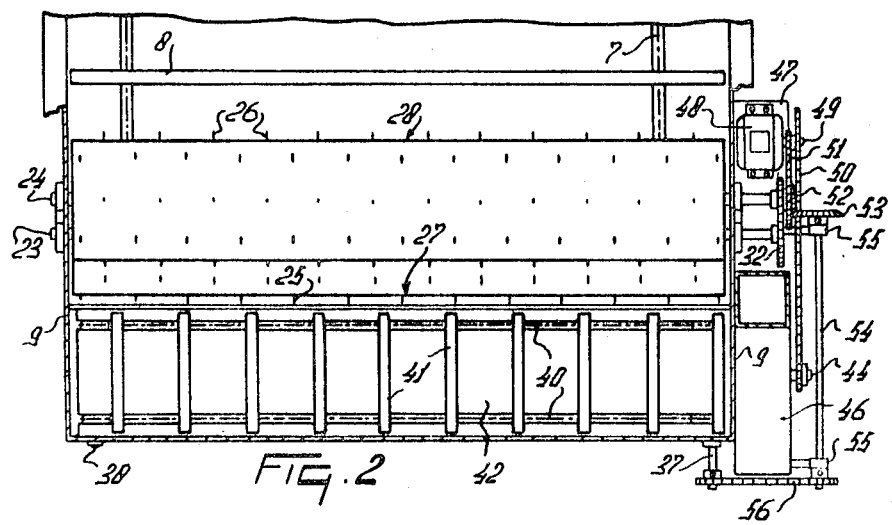
INVENTOR
CORNELIS VAN DER LELY
BY
Mason, Mason & Albright
Attorneys

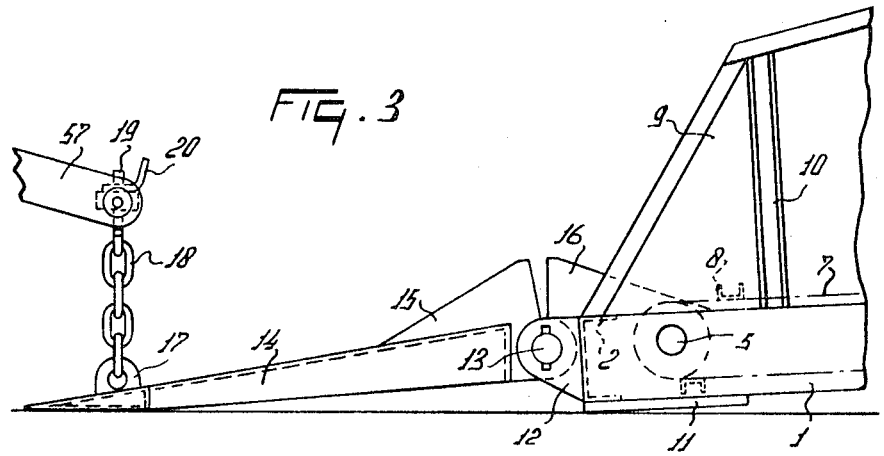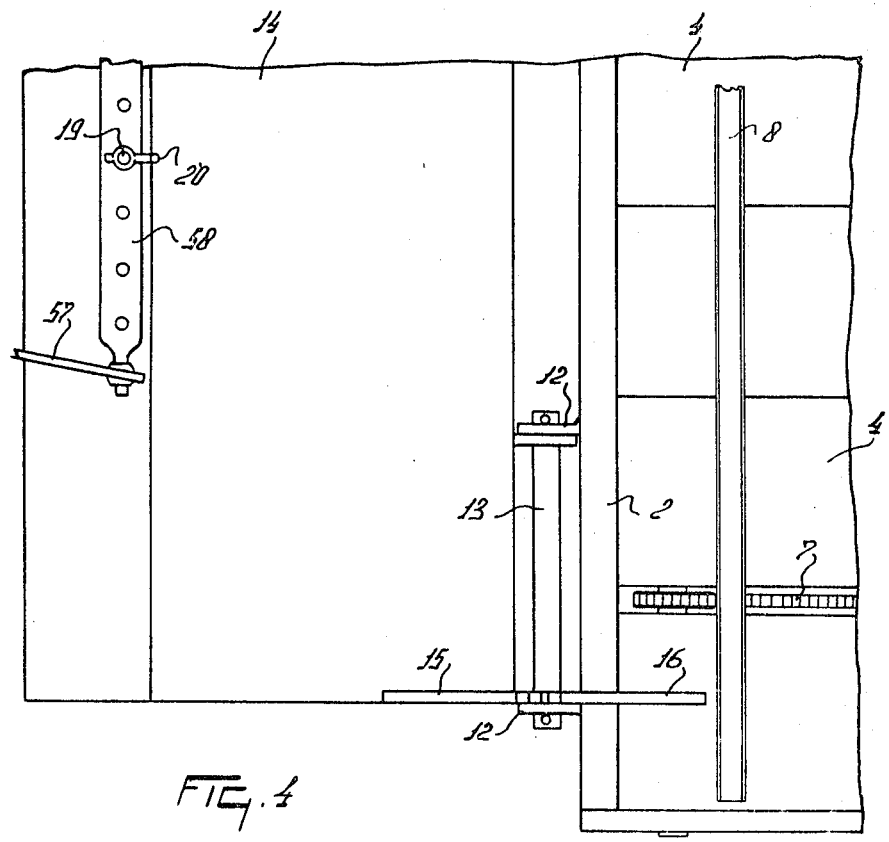

INVENTOR
CORNELIS VAN DER LELY

July 15, 1969 C. VAN DER LELY 3,455,608
DEVICE FOR FEEDING CROP TO A STORAGE LOCATION OR A CONVEYOR
Filed July 26, 1966 5 Sheets-Sheet 4

INVENTOR
CORNELIS VAN DER LELY
BY
Mason, Mason & Albright
Attorneys

July 15, 1969  C. VAN DER LELY  3,455,608
DEVICE FOR FEEDING CROP TO A STORAGE LOCATION OR A CONVEYOR
Filed July 26, 1966  5 Sheets-Sheet 5

INVENTOR
CORNELIS VAN DER LELY
BY
Mason, Mason & Albright
Attorneys

United States Patent Office 3,455,608
Patented July 15, 1969

3,455,608
DEVICE FOR FEEDING CROP TO A STORAGE LOCATION OR A CONVEYOR
Cornelis van der Lely, 7 Bruschenrain, Zug, Switzerland
Filed July 26, 1966, Ser. No. 571,379
Claims priority, application Netherlands, Aug. 5, 1965, 6510160
Int. Cl. B65g 53/44
U.S. Cl. 302—37                                30 Claims

ABSTRACT OF THE DISCLOSURE

A stationary unloading device for first receiving crop and then feeding crop to a silage pit or other location. The device has a movable floor which at the forward end is supported on the ground and slopes up towards the rear end where a plurality of conveyor members are positioned one above the other. Upright walls are located on either side of the floor and the conveyor members have crop engaging elements that rotate along closed paths.

---

In accordance with the invention there is provided a device for feeding crop to a storage location, such as a silage pit or to a conveyor, wherein the device comprises a plurality of conveying members which are arranged one above the other and which are mounted for rotation plate shaped or knife shaped, crop engaging members being mounted on the peripheries of the conveying members and being movable along closed paths during rotation of the conveying members.

It is thus possible, in an embodiment of the invention to have an effectively operating device by means of which crop can be fed in a uniform, airy flow directly to a store or storage location, for example a silo, a hay loft or a cattle fodder place or to a conveyor which displaces the crop further.

For a better understanding of the invention and to show how the same may be readily carried into effect, reference will now be made, by way of example, to the accompanying drawings, in which:

FIGURE 1 is a side elevation of the hindmost part of a device according to the invention, FIGURE 2 is a sectional view, to an enlarged scale, taken on the line II—II in FIGURE 1, the guide member for crop located between the side walls being omitted, FIGURE 3 shows, on an enlarged scale, a side elevation of the foremost part of the device and of means for attaching the device to a tractor.

FIGURE 4 is a plan view corresponding to FIGURE 3,

Figure 5:
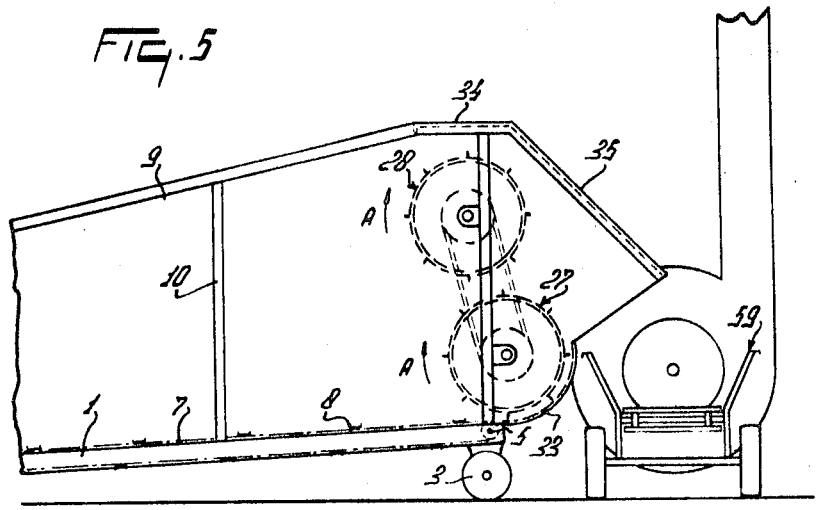
Figure 6:
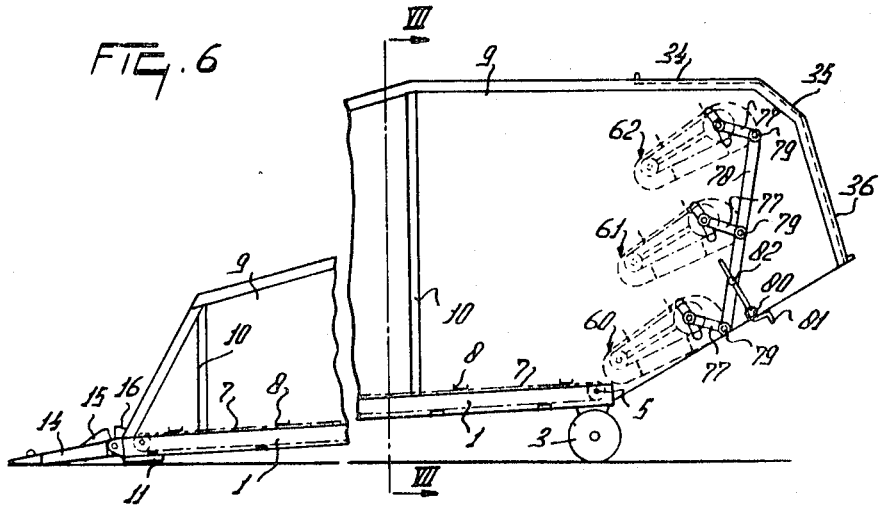
Figure 7:
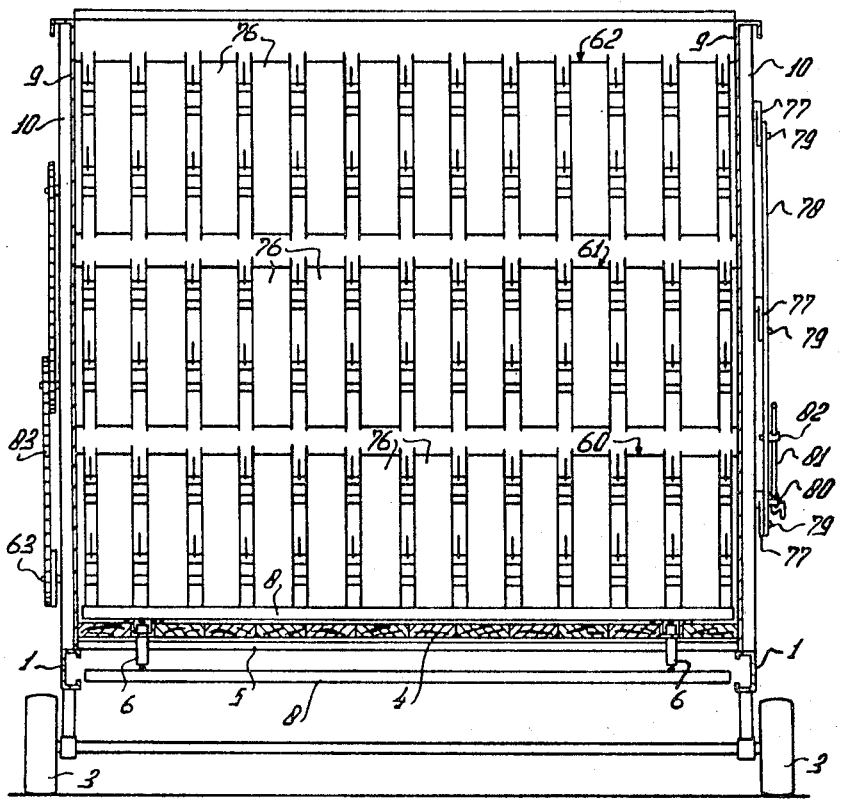
Figure 8:
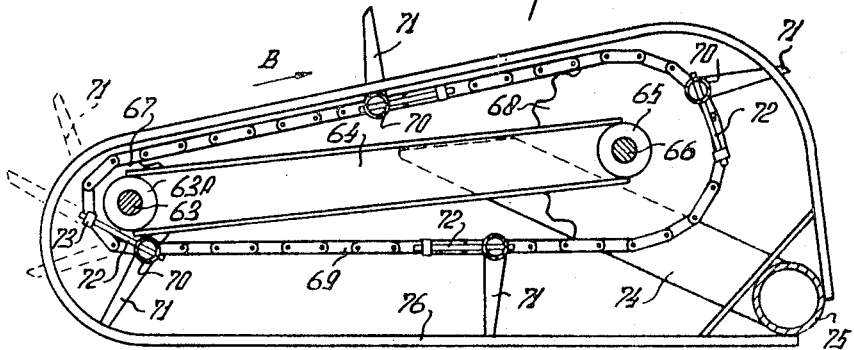
Figure 9:
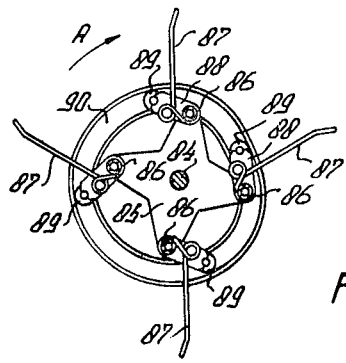
Figure 10:
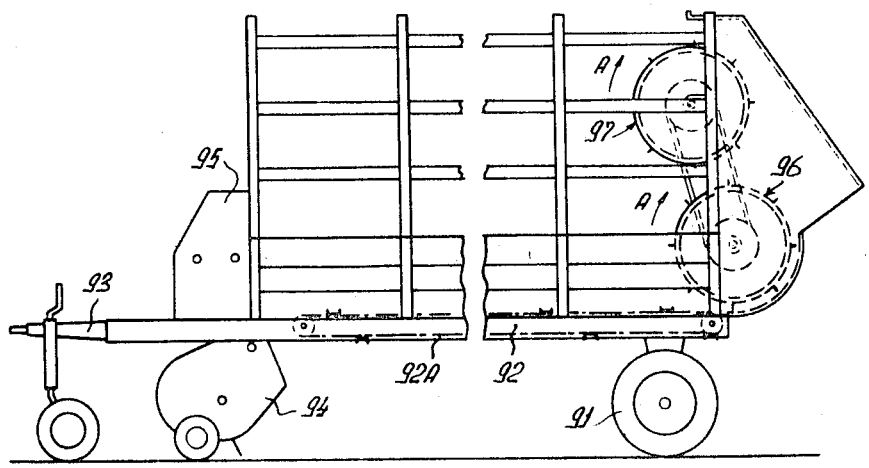

FIGURE 5 is a side view of a second embodiment of a device according to the invention, FIGURE 6 is a side elevation of a third embodiment of a device according to the invention, FIGURE 7 is a sectional view, to an enlarged scale, taken on the line VII—VII in FIGURE 6, FIGURE 8 shows on an enlarged scale a conveying member forming part of the device of FIGURES 6 and 7, FIGURE 9 is a sectional view of a conveying member formed by a drum with controllable tines, and FIGURE 10 is a side view of a device according to the invention in the form of a vehicle.

Referring now to FIGURES 1 to 4, the device is a stationary arrangement comprising two parallel beams 1, located near the sides of the arrangement and interconnected by transverse beams 2 (FIGURE 3). The frame formed by the beams 1 and 2 is supported near one end by ground wheels 3. A floor 4 (FIGURE 4) of boards is provided on the frame. In bearings fastened to the frame beams 1 are journalled shafts 5, extending at right angles to the frame beams and having sprockets 6 secured to them. Endless chains 7 are taken over the sprockets 6. Channel beams 8 extending parallel to the shafts 5 are fastened to said chains 7. The chains 7 and the beams 8 constitute an endless movable floor, an upper run of which bears on the floor 4, and a lower run is located beneath the floor 4. The frame beams 1 are provided with upright walls 9 supported by beams 10 disposed at right angles to the beams 1.

The ends of the beams 1 remote from the ground wheels 3 are provided with plates 11, which are arranged to bear on the ground in the position shown in FIGURE 3. The beams 2, interconnecting the frame beams 1, are provided with supports 12 at a distance from the ground wheels 3. With the aid of shafts 13, extending parallel to the shafts 5 a flap 14 is pivoted to the supports 12. On the upper side of the flap 14, vertical triangular plates 15 are provided which are co-planar with plates 16, fastened to the beam 2. It will be evident that the flap 14 can be turned out of the position shown in FIGURE 3 through a given angle upwardly, which turning is bounded by the stops afforded by the plates 15 and 16. The front edge of the flap 14 remote from the shafts 13 is furthermore provided with a leg support 17, with which is coupled the end of a chain 18. The free end of the chain 18 is connected to a screwthreaded rod 19, on which a wing nut 20 can be screwed. The purpose of said chain will be set out more fully hereinafter.

The vertical beams 10 located nearest to the ground wheels 3 are provided with bearings 21 and 22 at different heights above the floor 4. Shafts 23 and 24, extending parallel to the shafts 5, are journalled in said bearings. Conveying members in the form of drums 27 and 28, provided with crop engaging members or tines 25 and 26 respectively are fastened to the shafts 23 and 24 respectively. Preferably the tines 25 and 26 are plate shaped and it has the form of knives. The ends of the shafts 23 and 24 projecting from the side walls 9 are provided with sprockets 30 and 31 respectively, which are linked to each other by a chain 32. The rotary axis of the lowermost drum 27 is located approximately in the vertical plane passing through the adjacent end of the floor 4, whereas the rotary axis of the drum 28 is located at a given distance in front of said vertical plane. The distance between said two rotary axis is, when measured in a horizontal direction, smaller than ⅓ of the diameter of the drum. The diameter of a drum is nearly ⅕ of the length of a drum.

The frame formed by the beams 1 and 2 is provided with a plate 33, extending away from said vertical plane and away from the frame, said plate 33 being disposed concentric with respect to the center line of the shaft 23 along the lower side of the drum 27 extending up to a point at a given distance below a horizontal plane passing through the center line of the shaft 23. The top edges of the side walls 9 are interconnected over and above the drums 27 and 28 by a horizontal plate 34. The parts of the side walls 9 projecting behind the drums are interconnected by a plate 35, which joins the plate 34 and extends therefrom obliquely to the rear in a downward direction. The rear ends of the side walls 9 are interconnected by a vertical plate 36, which joins the plate 35 and extends vertically downwards therefrom.

As will furthermore be apparent from FIGURE 1, bearings provided on the lower side of the plate 36 and on the upper side of the curved plate 33 receive horizontal shafts 37 and 38 extending at right angles to the shafts 5. The ends of the shafts 37 and 38, located near the plates 33 and 36, are provided with sprockets 39 over which endless chains 40 are taken. Beams or slats 41 are fastened to the chains 40 and the chains 40 and beams 41 form a conveyor belt, the upper run which is movable over a plate 42 provided between the plates 36 and 33. Near one side of the conveyor belt, there is arranged a housing 43 of a conveyor in the form of a blower, in which a fan is fastened to a shaft 44 which extends parallel to the shafts 5 and is rotatably mounted in the housing 43. The side wall of the housing 43 near the end of the conveyor belt (40, 41) is formed with an opening 45. Upwardly extending tubes 46 communicate with the housing 43.

The various movable parts can be driven by an electric motor 48 which is fastened to a support 47, secured to one of the side walls 9. The end of the shaft 49 of the electric motor projecting from the housing thereof is provided with two sprockets, one of which is coupled through a chain 50 with a sprocket on the shaft 44. The other sprocket is linked by a chain 51 to a sprocket on the shaft 24. The shaft 24 is provided with a bevel gear wheel 52, which engages a bevel gear wheel 53 on a shaft 54 extending parallel to the shaft 37. The shaft 54 is journalled in supports 55 which are fastened to the frame. On the side remote from the gear wheel 53, the end of the shaft 54 is provided with a sprocket which is linked by a chain 56 to a sprocket on the shaft 37. The endless floor formed by the chains 7 and the beams 8 may also be driven by the electric motor. However, the driving mechanism arranged between the electric motor and the endless floor is omitted from the figures for the sake of clarity. Such mechanism is preferably constructed so that the floor can be set moving independently of the drums 27 and 28 and the conveyor belt 40, 41. The arrangement may moreover be such that the floor can be driven either continuously or intermittently.

The electric motor 49 may be replaced by a shaft which can be coupled via an intermediate shaft with the power take-off shaft of a tractor or the like for driving the endless floor, the drums and the conveyor belt. Such a shaft may, if desired, be provided at the side of the electric motor, so that the various parts can be driven either by means of the electric motor or the power take-off shaft.

The device described above operates as follows: The load of a wagon, for example hay, grass or other crop, can be shed or unloaded onto the floor 4, for example, by driving the wagon over the flap 14 between the walls 9 and by drawing it gradually to the front during discharge. A further mode of operation avoids the necessity of driving over the floor 4, the wagon being left at the front of the floor 4 and the endless floor formed by the chains 7 and the beams 8 being set moving during the unloading process so that the material is distributed over the floor 4 and is urged away from the wagon. In this way the load of the wagon, for example a trailer with an endless floor, or a tipping wagon, can be discharged rapidly. The material distributed on the floor 4 is conveyed further by actuating the drums 27 and 28, forming conveying members, the conveyor belt 40, 41 and the blower of the housing 43. The crop on the floor 4 can be conveyed by the floor 7, 8 to the drums 27 and 28. The drums, rotating in the direction of the arrow A, disentangle the crop and deliver it over and across themselves onto the conveyor belt 40, 41. The plates 34, 35 and 36, which form a guide member for the crop, prevent excessive ejection of the crop. By means of the conveyor belt 40, 41, the crop is fed through the opening 45 to the fan or blower of the housing 43. The fan, which also forms a conveyor, displaces the crop through the channel 46 in an upward direction, so that the crop can be conveyed to a hay loft or a similar store located at a higher level than the device itself. The supply of crop to the drums 27 and 28 may be controlled by varying the speed of the endless floor 7, 8.

When the device has to be moved, the flap 14 can be coupled with the aid of the chain 18 with a mounting beam 58 arranged between the lower arms 57 of the three point hitch or lifting device of a tractor which is shown in FIGURES 3 and 4. By swinging upwards the arms 57 of the hydraulic lift, the flap 14 is turned around the shafts 13 until the plates 15 come into abutting engagement with the plates 16. Upon a further lift of the arms 57, the plates 11 are set free of the ground, so that the unloading device constitutes a single-axle trailer, which can be drawn away by a tractor without the need for using further means.

The embodiment shown in FIGURE 5 corresponds substantially with the preceding embodiment and similar parts are therefore designated by the same reference numerals. The most important difference from the preceding embodiment is that the conveyor belt 40, 41, as well as the vertical partition wall 36, is omitted. The wall 35 is bent over downwardly more steeply at a more acute angle and the wall 33 is slightly extended in an upward direction. In this device the load shed on the floor 4 can be moved for example onto a separate conveyor belt arrangement 59, which can be displaced independently of the unloading floor 7, 8, so that it may be employed for other purposes. With the aid of this system crop may be conveyed directly into a silo, silage pit or other store without the need for using further conveying members.

Also the embodiment shown in FIGURES 6 to 8 corresponds substantially with the preceding embodiments and corresponding parts are denoted by the same reference numerals. The drums 27 and 28 are, however, replaced by three conveyor belts 60, 61 and 62. Since the three conveyor belts have the same construction, the description of one of them may suffice.

Each conveyor belt comprises a horizontal shaft 63 (FIGURES 7 and 8) extending between the side walls 9 and journalled in bearings secured to said side walls. The shaft 63 is taken through bearings 63A, to which are fastened the ends of beams 64. The ends of the beams 64 remote from the bearings 63A are provided with bearings 65, holding a shaft 66, extending parallel to the shaft 63. The shaft 63 is provided with sprockets 67 and the shaft 66 has relatively larger sprockets 68. Chains 69 are taken along the sprockets 67 and 68. Beams 70, forming tine supports and extending parallel to the shafts 63 and 66, are pivoted to the chains 69 and provided with rigid plate shaped or knife like tines 71. The beams 70 have furthermore secured to them round rods 72, which are disposed at right angles to the tines. The rods 72 are journalled in holes provided in blocks 73, which are pivotally mounted on the chains at a given distance forwardly of the beams 70 with reference to the direction of movement B of the tines 71. The rods 72 are freely displaceable longitudinally in the blocks 73.

The beams 64 have secured to them beams 74 (FIGURE 8), extending obliquely to the rear in downward direction and interconnected by a beam 75, extending parallel to the shaft 66. To the beams 70 are fastened the ends of curved plates 76 which are channel shaped in cross-section. The plates 76 are disposed, as is shown in FIGURE 8, closely along the upper portion of the chain 69 and are spaced at such a distance from the lower portion of the chain that the ends of the tines 71 cannot project below the lower portions of the plates 76. The ends of the shafts 66 are taken through elongated holes in the side walls 9. The ends of the shafts 66 projecting from one of the side walls 9 are provided with arms 77, which are hinged to a track rod 78. The shafts 63 of the various conveyor belts 60 to 62 and pivotal shafts 79, by means of which the arms 77 are hinged to the track rod 78, are located at the corners of a parallelogram. A support 80, secured to the side wall 9 concerned, holds a screwthreaded crank 81 in such a way that the latter can be turned but cannot be displaced longitudinally with respect to the support 80. The screwthreaded end is screwed through a tapped hole in a block 82 hinged to the track rod 78. It will be apparent that by turning the crank 81 the position of the conveyor belts 60 to 62 can be varied, since the latter can then turn about the shafts 63.

The ends of the shafts 63 remote from the arms 77 are provided with sprockets, which are linked to each other by chains 83 (FIGURE 7). The members formed by the conveyor belts 60 to 62 and the endless floor can be driven in the same manner as described for the preceding embodiment, but for the sake of clarity this is not shown in the figures. It will furthermore be apparent that, as in the first embodiment, a conveyor belt and a blower may be provided at the rear end of the system.

From FIGURE 6 it will furthermore be apparent that the shafts 63 of the two upper conveyor belts 61 and 62 are located at different distances behind a vertical plane going through the shaft 63 of the lower conveyor belt 60.

The device described with reference to FIGURES 6 to 8 operates as follows:

As in the preceding embodiments the whole load of an agricultural vehicle can be unloaded between the upright walls 9 of the arrangement or device. By actuating the endless floor, the crop can be fed to the conveyor belts 60 to 62. The latter are driven so that the tines move in the direction of the arrow B (FIGURE 8). From FIGURE 8 it will be seen that the tines 71 extend with respect to the direction of movement), away from the tine support beams 70 obliquely forwardly at the instant of contacting the crop near the side of the conveyor belt where the smaller sprockets 67 are mounted. This is obtained by means of deflecting means formed by the parts 72 and 73, located in front of the tines 71 with respect to the direction B, which means is operable to alter the angular setting of the tines relative to the further parts of the conveying member and relative to the closed path described by the tines during operation of the conveying member. The crop is displaced by the tines 71 over the plates 76 to the rear and, near the rear side of the conveying member, the tines are withdrawn from the crop between the plates 76. The edges of the plates 76 facing the crop thus serve as scrapers for the tines 71 and prevent crop from sticking to the tines. Since the tines fastened to the lower portion of the chains 61 at any instant do not project beneath the plates 76, the tines of a higher conveying member (62 over 61 or 61 over 60) cannot counteract the displacement of the crop by the tines of a lower conveying member. The plates 34 to 36 also form a guide member for the crop and prevent the crop from being ejected to an excessive extent.

Also the drums of the first two embodiments can be provided with controllable tines, as is shown by way of example in FIGURE 9. A drum is mounted on a shaft 84, to which supports 85 are fastened. The supports 85 hold tine supports 86 which extend parallel to the shaft 84 and are provided with tines 87. The ends of the tine supports are provided with arms 88, with the ends of which rollers 89 are coupled. The rollers 89 are located in a guide 90. The guide 90 is shaped in a form such that in their lowermost and uppermost positions the tines extend at least approximately radially with respect to shaft 84, whereas over that part of their track in which the tines are in contact with the crop on the floor (on the lefthand side in FIGURE 9), they extend obliquely to the front away from their fastening points on the tine supports with respect to the direction of movement A. The tines are controlled so that on the delivery side for the crop (the right hand side of FIGURE 9) the tines extend obliquely to the rear away from their fastening points on the tine supports with respect to the direction of movement A of the drum, so that the crop is more easily ejected from the tines. Hence the arms 88, rollers 89 and guide 90 comprise deflecting means operable to alter the angular setting of the tines relative to the conveying members and relative to the closed path described by the tines during operation of the conveying members.

It is furthermore possible to arrange the conveying members employed in the stationary arrangement described above in a vehicle of the kind shown in FIGURE 10. The vehicle shown comprises a frame 92 supported from ground wheels 91 and provided at the front with a drawbar 93 for attaching the vehicle to a tractor or the like. The vehicle is furthermore provided with a pick-up member 94 comprising a rotatable tined body for picking up crop lying on the ground and a pushing or feeding member 95. When the vehicle is moved across a field of mown crop, the pick-up members 94 can collect the crop lying on the ground and the picked-up crop can be displaced by means of the feeder 95 into the loading space of the vehicle. An endless floor 92A arranged on the loading floor, is capable of displacing the crop longitudinally of the vehicle. When the vehicle is fully loaded, it can be driven towards an unloading site, such as a silage pit. For unloading the vehicle, the crop can be fed by means of the floor to rotary conveying members 96 and 97, provided on the rear side of the vehicle. In the embodiment shown in FIGURE 10, these members 96 and 97 correspond to the drums 27 and 28 shown in FIGURE 1. By means of the conveying members 96 and 97, the crop is ejected from the loading space of the vehicle. The crop may be fed directly to a silo or a stall or store forming a feeding place for cattle. The vehicle may be stationary or it may be slowly drawn during unloading.

I claim:

1. A stationary device adapted to receive the load of an agricultural wagon and to feed the crop to a storage location, including a silage pit or the like, or to a conveyor, comprising a floor and a plurality of conveying members located above said floor adjacent one end thereof in substantially vertical arrangement, one above the other, said conveying members having crop-engaging means mounted for rotation about the peripheries of said conveying members, said crop-engaging means being movable along closed paths during rotation, said floor extending over its entire length obliquely downwards away from said conveying members, upright wide walls on either side of said floor, said conveying members being located between said side walls and being arranged such that the lowermost point of the path traced by the crop-engaging means of the lowermost conveying member is located substantially at the same level as the floor and the uppermost point of the path traced by the crop-engaging means of the upper conveying member is located substantially at the same level as the highest points of the side walls whereby clogging of the conveying members is prevented, said conveying members being tined drums, the distance between the outer peripheries of said drums being less than one half the diameter of one of said drums, means for moving crop over said floor towards said conveying members, the forward end of said floor being located near and supported by the ground whereby crop can be dropped out of a wagon at the forward end and be moved upwardly towards said conveying members.

2. A device as claimed in claim 1, wherein deflecting means is provided for each conveying member and the angular setting of said crop engaging means is alterable relative to the paths of rotation of said conveying members.

3. A device as claimed in claim 1, wherein a guide member for crop is arranged above said conveying members.

4. A device as claimed in claim 1, wherein a further conveying member is provided for receiving the crop displaced by said first-mentioned conveying members.

5. A device as claimed in claim 4, wherein said further conveying member is arranged to displace crop in a direction transverse of the direction in which the crop is displaced by said first-mentioned conveying members.

6. A device as claimed in claim 5, wherein said further conveying member is a conveyor belt.

7. A device as claimed in claim 1, wherein the crop engaging means are tines and the angles of said tines relative to the path of said conveying members are controlled by a deflecting means whereby, at the instant of engaging the crop to be displaced, said tines extend forwardly from their fastening points on said conveying members with reference to the intended direction of movement of crop.

8. A device as claimed in claim 1, wherein said conveying members are arranged in echelon to be located at different distances from a vertical plane.

9. A device as claimed in claim 1, wherein said crop engaging means are tines and scrapers are provided between said tines.

10. A device as claimed in claim 9, wherein each scraper has a U-shaped cross section.

11. A device as claimed in claim 10, wherein the limbs of the U-shaped section extend at least substantially parallel to said tines in a direction towards the crop.

12. A device as claimed in claim 1, wherein the diameter of a drum is greater than $\frac{1}{7}$ of the length of a drum.

13. A device as claimed in claim 1, wherein the angular setting of the tines on said drums relative to the paths of said conveyor members are variable and controlled by deflecting means whereby, at the instant of engaging crop, said tines extend forwardly with reference to the direction of rotation of the drums away from the periphery of the drum and at the instant of crop delivery by said drums, said tines extend rearwards from the drum periphery with respect to the direction of rotation of the drums.

14. A device as claimed in claim 1, wherein said conveyor members are arranged to be driven by a power take-off shaft.

15. A device as claimed in claim 1, wherein said conveying members all rotate in the same direction.

16. A device as claimed in claim 1, wherein said crop engaging means are tines which move along the uppermost part of their paths in the same direction as crop is displaced.

17. A device as claimed in claim 1, wherein ground wheels are arranged beneath said conveying members.

18. A device as claimed in claim 1, wherein a conveyor unit is mounted near the same end of said floor as said conveying members for elevating crop to a higher level.

19. A device as claimed in claim 18, wherein said conveyor unit includes a blower.

20. A device as claimed in claim 19, wherein said blower rotates in the same direction as at least one of said conveying members.

21. A device as claimed in claim 18, wherein said floor is an endless movable floor.

22. A stationary device for feeding crop to a storage location, including a silage pit or the like, or to a conveyor, said device comprising a floor and a plurality of conveying members located above said floor adjacent one end thereof in vertical arrangement, one above the other, said conveying members having crop engaging means mounted for rotation about the peripheries of said conveying members, said crop engaging means being movable along closed paths during rotation, said floor extending obliquely downwards away from said conveyor members, upright side walls on either side of said floor and means for moving crop over said floor towards said conveying members, said conveying members being conveyor belts.

23. A device as claimed in claim 22, wherein each conveyor belt extends obliquely upwards from an end arranged to face the crop.

24. A device as claimed in claim 23, wherein each conveyor belt comprises chains guided along sprockets fastened to shafts located at a given distance from each other and said crop engaging means are tines, said chains being interconnected by tine supports, to which said tines are secured.

25. A device as claimed in claim 24, wherein the diameter of a sprocket located at one end of the conveyor belt arranged to face the crop is smaller than the diameter of a sprocket located on the other side of said conveyor belt.

26. A device as claimed in claim 24, wherein said tine supports are pivotally connected to said chains and wherein guide members afford deflecting means associated with said chains.

27. A device as claimed in claim 26, wherein at least one arm is fastened to one tine support, said arm extending substantially at right angles to the tines fastened to said one tine support, said arm being journalled to be displaceable longitudinally in a supporting member pivotally coupled with said chain at a given distance forwardly of said one tine support with reference to the intended direction of movement of the chain.

28. A device as claimed in claim 22, wherein near one end, said conveyor belts are pivotally coupled with said device and fixable in a plurality of angular positions with respect to the device.

29. A device as claimed in claim 28, wherein said conveyor belts are pivotally coupled with each other by means of a track rod, which can be adjusted by a screw spindle.

30. A device as claimed in claim 22, wherein a flap is pivotally connected to said device and transport coupling members are secured to said flap, a plurality of stops on said device for limiting upward turning of the flap.

References Cited

UNITED STATES PATENTS

| | | | |
|---|---|---|---|
| 2,743,832 | 5/1956 | Kappelmann | 214—519 |
| 2,822,946 | 2/1958 | Van Drisse | 214—519 |
| 2,952,493 | 9/1960 | Finn | 302—37 |
| 3,143,380 | 8/1964 | Dehring et al. | 302—37 |
| 3,214,050 | 10/1965 | McCoweghy | 214—519 |
| 3,275,176 | 9/1966 | Kasten | 214—519 |
| 3,280,961 | 10/1966 | McCombie | 222—415 |

ANDRES H. NIELSEN, Primary Examiner